(12) United States Patent
Wakui

(10) Patent No.: US 7,863,212 B2
(45) Date of Patent: Jan. 4, 2011

(54) PROCESS OF CATALYTIC CRACKING OF HYDROCARBON

(75) Inventor: Kenichi Wakui, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 1086 days.

(21) Appl. No.: 10/542,787

(22) PCT Filed: Jan. 20, 2004

(86) PCT No.: PCT/JP2004/000426

§ 371 (c)(1), (2), (4) Date: Feb. 6, 2006

(87) PCT Pub. No.: WO2004/076596

PCT Pub. Date: Sep. 10, 2004

(65) Prior Publication Data

US 2006/0144759 A1    Jul. 6, 2006

(30) Foreign Application Priority Data

Jan. 24, 2003   (JP)   ............................. 2003-016378

(51) Int. Cl.
| | |
|---|---|
| *B01J 29/06* | (2006.01) |
| *B01J 21/00* | (2006.01) |
| *B01J 29/00* | (2006.01) |
| *C10G 47/02* | (2006.01) |
| *C10G 47/24* | (2006.01) |
| *C10G 47/00* | (2006.01) |
| *C10G 11/00* | (2006.01) |
| *C10G 11/02* | (2006.01) |
| *C10G 11/04* | (2006.01) |

(52) U.S. Cl. ........................... 502/73; 502/65; 208/108; 208/111.01; 208/113; 208/118; 208/120.01; 208/121

(58) Field of Classification Search ................. 208/108, 208/111.01, 113, 118, 120.01, 121; 502/65, 502/73

See application file for complete search history.

(56) References Cited

U.S. PATENT DOCUMENTS

| | | | | | |
|---|---|---|---|---|---|
| 3,551,513 | A | * | 12/1970 | Suzukawa et al. | ............ 585/634 |
| 3,669,877 | A | * | 6/1972 | Friedrich | ..................... 208/164 |
| 4,340,465 | A | * | 7/1982 | Miller et al. | ........... 208/120.15 |
| 4,575,414 | A | * | 3/1986 | Skraba | ........................ 208/157 |
| 4,632,749 | A | * | 12/1986 | Hilfman | ................ 208/120.01 |
| 5,120,893 | A | * | 6/1992 | Gabriel et al. | ............... 585/653 |
| 5,904,837 | A | | 5/1999 | Fujiyama | |

FOREIGN PATENT DOCUMENTS

| | | | |
|---|---|---|---|
| JP | 11-180902 | * | 7/1999 |
| WO | 99/57087 | | 11/1999 |

OTHER PUBLICATIONS

Translation of Written Opinion for PCT/JP2004/000426.*
Catalyst Techonology 3 Catalyst Equipment and Its Design, p. 377, lines 18-19 and lines 22-30, p. 377 last line to p. 378, line 3 and p. 419, lines 7-13 (with English translation and Certification page).

* cited by examiner

*Primary Examiner*—Patricia L Hailey
(74) *Attorney, Agent, or Firm*—Oblon, Spivak, McClelland, Maier & Neustadt, L.L.P.

(57) ABSTRACT

The present invention provides a process for the catalytic cracking of a hydrocarbon, characterized in that the catalytic cracking is carried out in the presence of a crystalline aluminosilicate zeolite catalyst carrying a rare earth element in an amount ranging from 0.4 to 20 in terms of atomic ratio relative to the aluminum of the zeolite using a reactor which permits continuous regeneration of the catalyst and which is of a fluidized bed type, a moving bed type, or a transfer line reaction type under reaction conditions involving a reaction temperature ranging from 500 to 700° C., a reaction pressure ranging from 50 to 500 kPa, a steam to hydrocarbon mass ratio ranging from 0.01 to 2, and a contacting time ranging from 0.1 to 10 seconds.

With this process, the generation of by-products such as aromatic hydrocarbons and heavy hydrocarbons can be inhibited and light olefins such as ethylene and propylene can be selectively produced in a stable manner for a long period of time.

9 Claims, No Drawings

PROCESS OF CATALYTIC CRACKING OF HYDROCARBON

TECHNICAL FIELD

The present invention relates to a process for producing light olefins, mainly ethylene and propylene, by catalytic cracking of a hydrocarbon in the presence of a catalyst.

BACKGROUND ART

Light olefins such as ethylene and propylene are important substances as basic starting materials for various chemicals.

One conventionally widely practiced process for producing such light olefins includes heating and cracking a raw material feed, which may be a gaseous hydrocarbon such as ethane, propane or butane or a liquid hydrocarbon such as naphtha, in the atmosphere of steam within an external heating-type tubular furnace.

The above process, however, has problems because it is necessary to conduct the cracking at a high temperature of 800° C. or more in order to increase the olefin yield and, hence, expensive materials must be used to construct the apparatus.

To cope with these problems, various studies have been made on catalytic cracking of a hydrocarbon using a catalyst.

Especially, there have been reported a large number of processes using a solid acid, particularly a pentasil-type zeolite such as ZSM-5, since relatively high ethylene and propylene yields (each yield is from about 10 to about 30 mass % based on the raw material hydrocarbon) is obtainable at a reaction temperature of from 500 to 700° C.

For example, Japanese Patent No. Hei 03-504737A and Japanese Patent No. Hei 06-346062A disclose catalytic cracking processes using ZSM-5 catalysts having a specific acid value or acidity.

Japanese Patent No. Hei 02-1413A and Japanese Patent No. Hei 02-184638A disclose catalytic cracking processes using ZSM-5 catalysts containing a transition metal such as copper, cobalt or silver.

U.S. Pat. No. 5,232,675, U.S. Pat. No. 5,380,690, European Patent No. 727,404, Japanese Patent No. Hei 11-180902A and Japanese Patent No. Hei 11-253807A disclose catalytic cracking processes using ZSM-5 catalysts containing a rare earth element.

In general, the reaction using such zeolite catalysts encounters a problem because carbon (coke) formed during excess decomposition of hydrocarbons or hydrogen transfer reactions deposits on the catalyst to cause deterioration of the activity thereof. Thus, according to circumstances, continuous regeneration of the catalyst by fluidized bed reactions is required.

With the continuous regeneration type reactor, it is necessary to strictly control the operation conditions in order to control the yield of the reaction products.

That is, not only the reaction temperature and reaction pressure but also the steam/hydrocarbon mass ratio, catalyst/hydrocarbon mass ratio and other operation conditions such as WHSV and contacting time have a great influence upon the yield and selectivity of the reaction products.

Generally, hydrogen transfer reaction proceeds more when zeolite used in fluidized bed-type catalytic cracking has a strong activity as a solid acid.

While the hydrogen transfer reaction is advantageous from the standpoint of increasing the degree of branching or improving the octane value of gasoline fractions produced by the cracking, olefin fractions are apt to be converted into heavier fractions and into paraffin as a result of the hydrogen transfer. Therefore, it is necessary to suppress the hydrogen transfer reaction in a certain degree in the cracking reactor, when more olefins are intended to be produced.

Japanese Patent No. Hei 01-110635A discloses a process in which catalytic cracking is performed using an ordinary catalytic cracking catalyst such as rare earth elements-exchanged faujasite at a temperature ranging from 500 to 650° C. and WHSV ranging from 0.2 to 20 $h^{-1}$ Since the catalyst has a strong hydrogen transfer activity, however, it is necessary to maintain the catalyst/hydrocarbon mass ratio at a relatively small value ranging from 2 to 12. The total yield of ethylene and propylene is as low as about 30 mass % or less based on the raw material.

Japanese Patent No. Hei 09-504817A disclose a process in which catalytic cracking is carried out at a temperature ranging from 480 to 680° C. and a contacting time ranging from 0.1 to 6 seconds using a high silica-content pentasil-type zeolite catalyst containing phosphorus and a rare earth element.

The catalyst which contains a rare earth element in an amount of 0.3 or less in terms of atomic ratio of the rare earth element to the aluminum contained in the zeolite can slightly inhibit a hydrogen transfer reaction. Although a slightly large catalyst/hydrocarbon mass ratio in the range of from 4 to 20 can be used, the yield of ethylene and propylene is not significantly improved.

The catalyst disclosed in Japanese Patent No. Hei 11-180902A or Japanese Patent No. Hei 11-253807A is a zeolite catalyst carrying a larger amount of a rare earth element in the form of an oxide as compared with the conventional catalyst. It is reported in the results of study obtained using a fixed bed reactor that a hydrogen transfer reaction is remarkably inhibited and the yield of ethylene and propylene increases.

However, no processes for producing ethylene and propylene using the above catalyst in a fluidized bed while continuously regenerating the catalyst have been established yet.

It is, therefore, an object of the preset invention to provide a process which can solve the above-mentioned problems and which can selectively produce light olefins such as ethylene and propylene from a gaseous or liquid hydrocarbon as a raw material in a stable manner for a long period of time, while inhibiting the formation of by-products such as aromatic hydrocarbons and heavy hydrocarbons.

DISCLOSURE OF THE INVENTION

The present inventors have made an earnest study with a view toward solving the above-mentioned problems. As a result, it has been found that the above-mentioned problems can be solved when the catalytic cracking of a hydrocarbon as a raw material for the production of light olefins is carried out in the presence of a specific zeolite catalyst at a specific temperature, a specific steam to hydrocarbon mass ratio, a catalyst to hydrocarbon mass ratio and a specific contacting time using a continuous-type reactor. The present invention has been completed based on the above finding.

Thus, the present invention provides a process for the catalytic cracking of a hydrocarbon, characterized in that the catalytic cracking is carried out in the presence of a crystalline aluminosilicate zeolite catalyst carrying a rare earth element in an amount ranging from 0.4 to 20 in terms of atomic ratio relative to the aluminum of the zeolite using a reactor which permits continuous regeneration of the catalyst and which is of a fluidized bed type, a moving bed type, or a transfer line reaction type under reaction conditions involving a reaction temperature ranging from 500 to 700° C., a reaction pressure ranging from 50 to 500 kPa, a steam to hydrocarbon mass ratio ranging from 0.01 to 2, a catalyst to hydrocarbon mass ratio ranging from 15 to 50, and a contacting time ranging from 0.1 to 10 seconds.

PREFERRED EMBODIMENT FOR CARRYING OUT THE INVENTION

As a hydrocarbon used in the present invention, there may be used any hydrocarbon which is liquid or liquid at ambient temperature and pressure.

Generally, a paraffin having from 2 to 30 carbon atoms, preferably from 2 to 20 carbon atoms or a hydrocarbon containing such a paraffin as a main component (10 mass % or more) may be used.

As such a hydrocarbon raw material, there may be mentioned, for example, a paraffin, such as ethane, propane, butane, pentane or hexane, and a hydrocarbon fraction such as naphtha or gas oil.

The raw material component is not limited only to a saturated hydrocarbon. A raw material containing an unsaturated bond may also be used.

The catalyst used in the present invention contains as a main ingredient a zeolite carrying a rare earth element in the form of an oxide.

The zeolite is preferably a high silica zeolite, particularly ZSM-5 and/or ZSM-11.

The zeolite has a $SiO_2/Al_2O_3$ molar ratio ranging from 25 to 800, preferably from 40 to 600, more preferably from 80 to 300.

The rare earth element is not specifically limited. As a preferred rare earth element, however, there may be mentioned lanthanum, cerium, praseodymium, neodymium, samarium, gadolinium and dysprosium.

The rare earth element may be used singly or as a mixture of two or more.

The modification of the catalyst with the rare earth element may be carried out by an ion exchange method, an impregnation method, hydrothermal synthesis method or other suitable methods using various salts, such as an acetate, a nitrate, a halide, a sulfate and a carbonate, or other compounds such as an alkoxide and acetylacetonate.

It is important that the rare earth element of the catalyst should be carried on or contained in the zeolite. When a rare earth compound (such as an oxide) is merely physically mixed with a zeolite, the effect of the present invention cannot be obtained.

In the catalyst of the present invention, the amount of the rare earth element ranges from 0.4 to 20, preferably from 0.6 to 5, more preferably from 1 to 3, in terms of atomic ratio thereof to aluminum of the zeolite. When the content of the rare earth element is less than 0.4 in terms of atomic ratio, by-products such as heavy coke and aromatic compounds are produced in a large amount. On the other hand, when the atomic ratio exceeds 20, the catalytic activity is so low that the olefin yield reduces.

The shape of the catalyst particles and the components other than the catalyst are not specifically limited. For example, the catalyst may be shaped into an ordinary fluidized bed-type catalyst for use in the present invention.

Namely, the catalyst may be molded together with a binder such as a clay mineral or an inorganic oxide into a shape suitable for a fluidized bed-type continuous reactor.

In this case, other zeolite components, an alkali metal, an alkaline earth metal, a transition metal, a noble metal, a halogen, phosphorus, etc. may be also incorporated into the composition.

The catalytic cracking reaction according to the present invention may be carried out in a reactor using a fluidized bed, moving bed or transfer line reaction mode, preferably in a reactor permitting continuous catalyst regeneration.

The reaction temperature ranges from 500 to 700° C., preferably from 550 to 680° C., more preferably from 580 to 650° C.

When the reaction temperature is less than 500° C., the cracking fails to sufficiently proceed. On the other hand, when the temperature exceeds 700° C., the olefin yield decreases as a result of excessive cracking reactions.

The reaction pressure ranges from 50 to 500 kPa, preferably from 100 to 300 kPa, more preferably from 150 to 200 kPa. When the pressure is lower than 50 kPa, it is necessary to use a device for reducing the pressure. When the pressure exceeds 500 kPa, on the other hand, the olefin yield decreases.

In the present invention, steam serves to dilute the raw material feed and to remove coke and thereby to improve the olefin yield. The amount of steam feed is such that the steam to hydrocarbon mass ratio ranges from 0.01 to 2, preferably from 0.1 to 1, more preferably from 0.2 to 0.5.

When the steam to hydrocarbon mass ratio is less than 0.01, the olefin yield reduces. On the other hand, when the steam to hydrocarbon mass ratio exceeds 2, the permanent deterioration of the catalyst is accelerated.

Although the catalyst used in the present invention contains a large amount of a rare earth element to suppress hydrogen transfer reactions, the cracking activity per catalyst unit mass is lower than that of the conventional catalytic cracking catalyst. For this reason, it is necessary to increase the catalyst to hydrocarbon mass ratio.

The term "catalyst to hydrocarbon mass ratio" as used herein is intended to refer to a ratio of the amount of the catalyst recirculated (ton/h) to the feed rate of the raw material hydrocarbon (ton/h). The catalyst to hydrocarbon mass ratio ranges from 15 to 50, preferably from 18 to 40, more preferably from 20 to 30.

When catalyst to hydrocarbon mass ratio is less than 15, the cracking reactions do not sufficiently proceed. On the other hand, when the catalyst to hydrocarbon mass ratio exceeds 50, the catalyst regeneration retention time required for the regeneration of the catalyst is so long that it is difficult to continuously regenerate the catalyst.

The time period for which the hydrocarbon is brought into contact with the catalyst within the reactor ranges from 0.1 to 10 seconds, preferably from 0.5 to 5 seconds, more preferably from 0.7 to 3 seconds, although the contact time may be controlled depending upon variation and amount of the hydrocarbon feed and desired addition rate.

The term "reactor which permits continuous regeneration of the catalyst" as used herein is intended to refer to a reactor which is of a fluidized bed type, a moving bed type or a transfer line reaction type and with which it is possible to carry out the reaction while discharging a portion of the recirculating catalyst and regenerating the discharged catalyst.

By carrying out the process of the present invention under the above-described conditions, the hydrocarbon raw material feed may be cracked with a high efficiency at a relatively low temperature so that light olefins such as ethylene and propylene can be selectively produced.

The present invention will be described in more detail below by way of examples. However, the present invention is not restricted to these examples in any way.

EXAMPLE 1

Preparation of Catalyst A

As a catalyst for catalytic cracking, ZSM-5 catalyst (10% La/ZSM-5) containing 10 mass % of La was prepared in accordance with the method disclosed in Japanese Patent No. Hei 11-180902A using proton-type ZSM-5 zeolite powder having a $SiO_2/Al_2O_3$ molar ratio of 50 (as measured with fluorescent X-ray) and a surface area of 380 $m^2/g$ (as measured by $N_2$ adsorption method).

The atomic ratio of La to the aluminum of the zeolite was 1.1.

The 10%-La/ZSM-5 was molded using kaolinite and alumina as a binder into a fluidized bed-type catalyst.

The molded catalyst contained 55.8 mass % of kaolinite and 23.0 mass % of alumina.

[Catalytic Cracking Reaction]

Catalyst A was treated with 100% steam at 800° C. for 6 hours for pseudo-equilibration. Using the resulting catalyst, catalytic cracking reaction of naphtha having the composition shown below was carried out with a fluidized bed-type reactor, which permitted continuous catalyst regeneration, under conditions involving a reaction temperature of 630° C., a reaction pressure of 140 kPa, a contacting time of 1 second, a steam to hydrocarbon (HC) mass ratio of 0.5 and a catalyst to hydrocarbon (HC) mass ratio of 20.

The results are shown in Table 1.

[Composition of Naphtha]
C4 fraction: 7.2 mass %
C5 fraction: 52.3 mass %
C6 fraction: 35.7 mass %
C7 fraction: 4.8 mass %
Specific gravity: 0.65 (15/4° C.)
Branch/Straight chain ratio: 0.73
Aromatic hydrocarbon content: 2 mass %

EXAMPLE 2

Preparation of Catalyst B

ZSM-5 catalyst (10% Pr/ZSM-5) containing 10 mass % of Pr (in place of La in Example 1) as a rare earth element was prepared and was molded into a fluidized bed-type catalyst in the same manner as that in Example 1.

The atomic ratio of Pr to the aluminum of the zeolite was 1.1. The molded catalyst contained 50.3 mass % of kaolinite and 24.5 mass % of alumina.

[Catalytic Cracking Reaction]

Using Catalyst B, catalytic cracking reaction of naphtha was carried out in the same manner as that in Example 1.

The results are shown in Table 1.

EXAMPLE 3

Using the same pseudo-equilibrated Catalyst A as described in Example 1, cracking reaction was carried out under the same reaction conditions as those described in Example 1 except that the reaction temperature was changed to 650° C. and the contacting time was changed to 0.8 second.

The results are shown in Table 1.

TABLE 1

| | Example No. | | |
|---|---|---|---|
| | Example 1 | Example 2 | Example 3 |
| Catalyst | | | |
| Rare earth element/Al (atomic ratio) | 1.1 | 1.1 | 1.1 |
| Reaction Conditions | | | |
| Reaction temperature (° C.) | 630 | 630 | 650 |
| Catalyst/HC (mass ratio) | 20 | 20 | 20 |
| Steam/HC (mass ratio) | 0.5 | 0.5 | 0.5 |
| Contacting time (sec.) | 1.0 | 1.0 | 0.8 |
| Product Composition (mass % based on naphtha feed) | | | |
| Ethylene | 25.8 | 24.8 | 29.5 |
| Propylene | 19.7 | 18.8 | 14.2 |
| Butenes | 6.7 | 7.1 | 5.2 |
| Aromatic compounds | 4.1 | 4.0 | 6.1 |
| Methane | 8.0 | 8.1 | 11.2 |
| Ethane | 8.8 | 8.5 | 8.3 |
| Propane | 8.5 | 8.0 | 7.4 |
| Butane | 2.7 | 2.5 | 2.3 |
| C5 fraction | 10.5 | 11.2 | 8.5 |
| Coke | 4.2 | 4.3 | 5.1 |
| Carbon monoxide | 0.6 | 0.7 | 0.7 |
| Carbon dioxide | 0.5 | 0.9 | 0.3 |

COMPARATIVE EXAMPLE 1

Preparation of Catalyst C

In the same manner as described in Example 1, a ZSM-5 catalyst containing 2 mass % of La was prepared using proton-type ZSM-5 zeolite powder having a $SiO_2/Al_2O_3$ molar ratio of 50 (as measured with fluorescent X-ray) and a surface area of 380 $m^2/g$ (as measured by $N_2$ adsorption method).

The atomic ratio of La to the aluminum of the zeolite was 0.2.

The 2%-La/ZSM-5 was molded using kaolinite and alumina as a binder into a fluidized bed-type catalyst.

The molded catalyst contained 55.0 mass % of kaolinite and 22.8 mass % of alumina.

[Catalytic Cracking Reaction]

Using Catalyst C, catalytic cracking reaction of naphtha was carried out in the same manner as that in Example 1. The results are shown in Table 2.

As will be appreciated from Table 2, the ethylene and propylene yields decrease when Catalyst C is used.

COMPARATIVE EXAMPLE 2

Using the same Catalyst A as used in Example 1, catalytic cracking reaction of naphtha was carried out in the same manner as that in Example 1 except that the catalyst to hydrocarbon mass ratio was changed to 12.

The results are shown in Table 2.

As will be appreciated from Table 2, satisfactory reaction results are not obtainable when the catalyst to hydrocarbon mass ratio is 12 which value is outside the range of from 15 to 50 according to the present invention.

TABLE 2

| | Comparative Example No. | |
|---|---|---|
| | Comparative Example 1 | Comparative Example 2 |
| Catalyst | | |
| Rare earth element/Al (atomic ratio) | 0.2 | 1.1 |
| Reaction Conditions | | |
| Reaction temperature (° C.) | 630 | 630 |
| Catalyst/HC (mass ratio) | 20 | 12 |
| Steam/HC (mass ratio) | 0.5 | 0.5 |
| Contacting time (sec.) | 1.0 | 1.0 |
| Product Composition (mass % based on naphtha feed) | | |
| Ethylene | 18.5 | 15.4 |
| Propylene | 13.2 | 11.6 |
| Butenes | 5.7 | 4.2 |
| Aromatic compounds | 10.0 | 3.5 |
| Methane | 8.0 | 6.2 |
| Ethane | 7.8 | 5.5 |
| Propane | 8.4 | 5.8 |
| Butane | 3.0 | 2.3 |
| C5 fraction | 18.2 | 39.7 |
| Coke | 5.5 | 4.0 |
| Carbon monoxide | 0.4 | 0.2 |
| Carbon dioxide | 0.3 | 0.2 |

INDUSTRIAL APPLICABILITY

With the process for the catalytic cracking of a hydrocarbon according to the present invention, light olefins such as ethylene and propylene can be selectively produced from a gaseous or liquid hydrocarbon as a raw material in a stable manner for a long period of time, while inhibiting the formation of by-products such as aromatic hydrocarbons and heavy hydrocarbons.

Accordingly, the reaction temperature can be relatively lower than that in the conventional thermal cracking and olefins can be produced under economically advantageous conditions.

The invention claimed is:

1. A process for producing light olefins, comprising: catalytically cracking a hydrocarbon feed in the presence of a crystalline aluminosilicate zeolite catalyst having a $SiO_2/Al_2O_3$ molar ratio ranging from 50 to 300 carrying a rare earth element in an amount ranging from 0.4 to 20 relative to the aluminum of the zeolite on an atomic ratio basis in a fluidized bed-type reactor which permits continuous regeneration of the catalyst under reaction conditions involving a reaction temperature ranging from 500 to 700° C., a reaction pressure ranging from 50 to 500 kPa, a steam to hydrocarbon mass ratio ranging from 0.1 to 1, a catalyst to hydrocarbon mass ratio ranging from 18 to 40, and a contact time ranging from 0.1 to 10 seconds.

2. The process for producing light olefins as defined in claim 1, wherein the rare earth element is at least one member selected from the group consisting of lanthanum, cerium, praseodymium, neodymium, samarium, gadolinium, and dysprosium.

3. The process for producing light olefins as defined in claim 1, wherein the rare earth element is carried in an amount ranging from 0.6 to 5 relative to aluminum of the zeolite on an atomic ratio basis.

4. The process for producing light olefins as defined in claim 3, wherein the rare earth element is carried in an amount ranging from 1 to 3 relative to aluminum of the zeolite on an atomic ratio basis.

5. The process for producing light olefins as defined in claim 1, wherein the steam to hydrocarbon mass ratio ranges from 0.2 to 0.5.

6. The process for producing light olefins as defined in claim 1, wherein the contact time ranges from 0.5 to 5 seconds.

7. The process for producing light olefins as defined in claim 1, wherein the hydrocarbon feed comprises a paraffin having from 2 to 30 carbon atoms.

8. The process for producing light olefins as defined in claim 7, wherein the hydrocarbon feed is ethane, propane, butane, pentane, hexane or a naphtha or gas oil fraction.

9. The process for producing light olefins as defined in claim 1, wherein the catalyst is a high silica content zeolite ZSM-5 or ZSM-11 catalyst.

* * * * *